US010803324B1

(12) United States Patent
Shen et al.

(10) Patent No.: US 10,803,324 B1
(45) Date of Patent: Oct. 13, 2020

(54) ADAPTIVE, SELF-EVOLVING LEARNING AND TESTING PLATFORM FOR SELF-DRIVING AND REAL-TIME MAP CONSTRUCTION

(71) Applicant: Waylens, Inc., Boston, MA (US)

(72) Inventors: Dawei Shen, Brookline, MA (US); Linlin Song, Shanghai (CN); Haowei Zhang, Wayland, MA (US)

(73) Assignee: Waylens, Inc., Waltham, MA (US)

( * ) Notice: Subject to any disclaimer, the term of this patent is extended or adjusted under 35 U.S.C. 154(b) by 0 days.

(21) Appl. No.: 15/860,976

(22) Filed: Jan. 3, 2018

Related U.S. Application Data

(60) Provisional application No. 62/441,866, filed on Jan. 3, 2017.

(51) Int. Cl.
*G06K 9/00* (2006.01)
*G05D 1/02* (2020.01)
*G06K 9/62* (2006.01)
*G05D 1/00* (2006.01)

(52) U.S. Cl.
CPC ....... *G06K 9/00798* (2013.01); *G05D 1/0088* (2013.01); *G05D 1/0221* (2013.01); *G05D 1/0246* (2013.01); *G05D 1/0278* (2013.01); *G06K 9/00805* (2013.01); *G06K 9/00818* (2013.01); *G06K 9/00825* (2013.01); *G06K 9/6256* (2013.01); *G05D 2201/0212* (2013.01)

(58) Field of Classification Search
CPC ........... G06K 9/00791; G06K 9/00798; G06K 9/00805; G06K 9/00818; G06K 9/00825; G05D 1/0088; G05D 1/0221; G05D 1/0246; G05D 2201/0212; G05D 2201/0213
See application file for complete search history.

(56) References Cited

U.S. PATENT DOCUMENTS

| 2019/0129422 | A1* | 5/2019 | Nojoumian | .......... | G05D 1/0088 |
| 2019/0164007 | A1* | 5/2019 | Liu et al. | ................ | G06K 9/627 |
| 2019/0187706 | A1* | 6/2019 | Zhou et al. | ........... | B60W 40/09 |

* cited by examiner

*Primary Examiner* — Andrew W Johns
(74) *Attorney, Agent, or Firm* — Wood Herron & Evans LLP

(57) ABSTRACT

Computer systems and methods for training and/or testing a self-driving vehicle. The systems and methods, via in-car cameras and sensors, capture video of conditions surrounding the vehicle, driving data related to control of the vehicle, and driver behavior data representing actions by a human controlling the vehicle. The systems and methods analyze the captured video data and driving data to derive decisions a computer would make to control the vehicle. The systems and methods analyze the captured driver behavior data to determine decisions made by the human to control the vehicle. The systems and methods evaluate the derived computer decisions in comparison to the determined human decisions to detect data indicating discrepancies between the derived computer decisions and the determined human decisions for controlling the vehicle. The systems and methods provide the detected data as input to a model for training and/or testing a self-driving vehicle.

16 Claims, 7 Drawing Sheets

An application interface showing pedestrians getting recognized by the hardware platform

ADAPTIVE, SELF-EVOLVING LEARNING AND TESTING PLATFORM FOR SELF-DRIVING AND REAL-TIME MAP CONSTRUCTION

RELATED APPLICATION

This application is a U.S. non-provisional of U.S. Provisional Application Ser. No. 62/441,866, filed Jan. 3, 2017, which is expressly incorporated herein by reference in its entirety.

TECHNICAL FIELD

The present invention is in the technical field of high-definition (HD) camera and multi-sensor hardware and software systems. In particular, the present invention includes HD cameras and multi-sensor hardware, along with Artificial Intelligence (AI) logic, to achieve a learning and testing system platform for self-driving (autonomous-driving) vehicles. The system platform generates output used to improve the reliability and intelligence of the decision logic for the self-driving vehicles.

Note that in this document the terms self-driving and autonomous-driving are used interchangeably. Further note in this document the terms self-driving and autonomous-driving are defined to include the multiple levels of autonomy in the domain of self-driving vehicles. These autonomy levels include full autonomy, in which no human driver needs to be present in the vehicle. These autonomy levels also include "assisted driving" vehicles, in which a computer provides longitudinal and transverse guides to the human driver in the vehicle. These autonomy levels further include advanced driver assistance systems (ADAS) for vehicles.

BACKGROUND

There are currently several significant challenges faced by the efforts of academic and industry, including Tesla and Google, in the domain of self-driving vehicles.

One challenge is that self-driving vehicles have limited test coverage. Current testing and data collection related to self-driving vehicles require the availability of a self-driving vehicle to perform the testing. However, currently only a limited number of vehicles already equipped with self-driving capabilities or data-acquisition capabilities are available to be deployed for testing and data collection. In addition, there are currently only limited environments suitable for testing these self-driving equipped vehicles. Further, current testing and data collection typically require manual human interaction, such that a human tester rides in the self-driving vehicle and manually records and reports decisions made by the vehicle to a server (e.g., a cloud service) for analysis.

Another challenge is that the data automatically generated in relation to a self-driving vehicle is too enormous in quantity to be collect by current applications. A self-driving vehicle typically generates approximately 30 Megabyte (MB) to 120 MB of data every second from its multiple sensors. The generated data includes, but is not limited to, the data collect from the HD camera, radar, sonar, global positioning system (GPS), and Lidar sensors of the self-driving vehicle. The enormous quantities of generated data has made storing, transmitting, and gathering the data for further analysis and model learning and training an obstacle to the efforts of academia and industry.

Yet another challenge is that the requirements for self-driving vehicles are in constant evolution. In particular, the logic (algorithms) implemented for self-driving vehicles to make decisions and take actions evolve constantly as data is continuously collected and used in learning, training, and refining new self-driving models. In turn, the logic and requirements determined from the new self-driving models need to be continuously redeployed to self-driving vehicles, which further impacts the previously discussed challenges on test coverage and data collection.

Further, the creation and update of real-time content-rich maps is a critical component for self-driving vehicles. However, maps traditionally only contain basic static information, such as routes, number of lanes, directions, speed limits, and the like, and map updates happen relatively infrequently and require labor-intensive reconnaissance. Some services such as Waze use a crowd-sourcing way to let drivers/passengers manually report road events to provide richer, more real-time updates to maps. However, the crowd-source ways still require manual interaction by the drivers/passengers and only support reporting of limited events.

SUMMARY OF THE INVENTION

Embodiments of the present invention address these significant challenges faced by current industry and academic efforts on self-driving cars. The embodiments, in contrast with existing common practice in self-driving, offer higher magnitudes of test coverage. For instance, these embodiments can be deployed in regular non-self-driving vehicles and collect data in a crowd-sourcing manner. Embodiments further significantly reduce the amount of data to be stored and transferred to a cloud service (or other powerful servers) as the mechanisms of these embodiments preprocess the bulk of the data with efficient hardware processing units and AI logic/algorithms. The mechanisms are specifically formulated to determine critical moments in the bulk of data so as to locate the most valuable data to be captured and transferred. Thus, the data transferred to the cloud service for continuously learning, training, and refining of new self-driving models is predetermined to be useful (critical) data in improving the logic/algorithms redeployed to self-driving vehicles.

Further, embodiments provide a powerful system for collecting critical data for map creation and updating for self-driving vehicles. In particular, the embodiments include data-acquisition sensors, availability of connectivity through high speed connections such as 4G/LTE, and computer vision technology that enable a robust solution for capturing real-time content-rich map information. These embodiments transfer the captured map information to a cloud service, in real-time, for map applications to utilize to create/update maps for assisting self-driving vehicles to make driving decisions.

These embodiments use high-definition (HD) camera and multi-sensor hardware and software to achieve the learning and testing system platform for self-driving vehicles, which generates the output used to improve the reliability and intelligence of the decision logic for the self-driving vehicles. In particular, these embodiments consist of interacting components that include, but are not limited to: a hardware platform, advanced software modules, and cloud services. The hardware platform may be installed inside vehicles and may include, but is not limited to, high-definition cameras, high-resolution GPS, multiple data-acquisition sensors for capturing car performance data and driver behavioral data, computer processing units, such as embedded central processing unit (CPU) and graphics processing unit (GPU), and a processing chipset specifically designed for implementing and supporting advanced AI logic/algorithms, such as computer vision, sensor fusion logic/algorithms, and 4G/Wi-Fi-based communication modules for transferring data to a cloud service.

The advanced software modules are operatively coupled to the hardware platform to provide various testing and data collection capabilities. These capabilities include preprocessing raw video captured from the HD cameras and raw data captured from the sensors. These capabilities further include parsing out of the captured video critical information including road information for real-time map construction and updates, differentiating between machine decision (as calculated by the advanced AI chipset based on the raw video and raw sensor data), and human judgement (captured as driver behavior data by sensors). These capabilities also include storing and transferring (e.g., client-server communications) such critical information to a cloud service for access by other map-based applications to constructs real-time maps, and self-driving training applications for further analysis and algorithmic training, the results of which could be foundational to self-driving technology.

The cloud service, as part of these embodiments, stores and organizes the real-time map information and makes it readily accessible for the map applications and self-driving applications. The cloud service may also store, organize, and make available geo-based driving information including road information as used in maps, drivers' behavioral information, and discrepancy between human and machine (computer controlling vehicle) judgements, which is rich and valuable data for further training and refining of self-driving algorithms. In some embodiments, the cloud service may be replaced by any other powerful system of servers.

Embodiments of the present invention are directed to a computer system and method of learning and testing a self-driving vehicle. The system includes one or more cameras, one or more sensors that capture driving data, and one or more sensors that capture driver behavior data. The system and method capture video representing conditions surrounding the vehicle, driving data related to control of the vehicle, and driver behavior data representing actions by a human controlling the vehicle. The system also includes one or more processing units. The computer system (via one of the processing unit) and method analyze the captured video data and captured driving data to derive decisions a computer would make to control the vehicle. The computer system (via one of the processing units) and method also analyze the captured driver behavior data to determine decisions made by the human to control the vehicle. In some embodiments, the derived computer decisions are calculated using an artificial intelligence (AI) model of a self-driving vehicle. In some system embodiments, a processing unit of the one or more processing units is an optimized processor suited for AI applications and the AI model is configured on the processing unit. In some of these system embodiments, the processing unit is a Movidius chipset module.

The system (one or more processing units and peripheral electronics executing software or firmware) and method then evaluate the derived computer decisions in comparison to the determined human decisions. The evaluation detects data that indicates discrepancies between the derived computer decisions and the determined human decisions for controlling the vehicle. The computer system (via one of the processing units) and method provides the detected data as input for a training model, the provided input being used by the training model to produce decision logic for a self-driving vehicle. In some embodiments, the providing of the map input includes transmitting the provided model input to cloud service, wherein training applications access the provided model input from the cloud service.

The system and method may further analyze the images of the captured video data to parse from the images information on the conditions surrounding the vehicle. In some embodiments, the conditions surrounding the vehicle include static conditions that include at least one of: road signs, lanes, and surrounding building structures. In some embodiments, the conditions surrounding the vehicle include real-time conditions that include at least one of: traffic, accidents, weather, and surrounding vehicles. The system and method may determine a timestamp for the parsed information and synchronize the time stamped parsed information with the captured driving data, the captured driver behavior data, and GPS data. The system and method may provide the synchronized data as input for map applications, the provided input being used by the map applications to construct real-time maps for self-driving. In some embodiments, the providing of the map input includes transmitting the provided map input to a cloud service, wherein map applications access the provided map input from the cloud service

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

System Architecture

Figure 1:
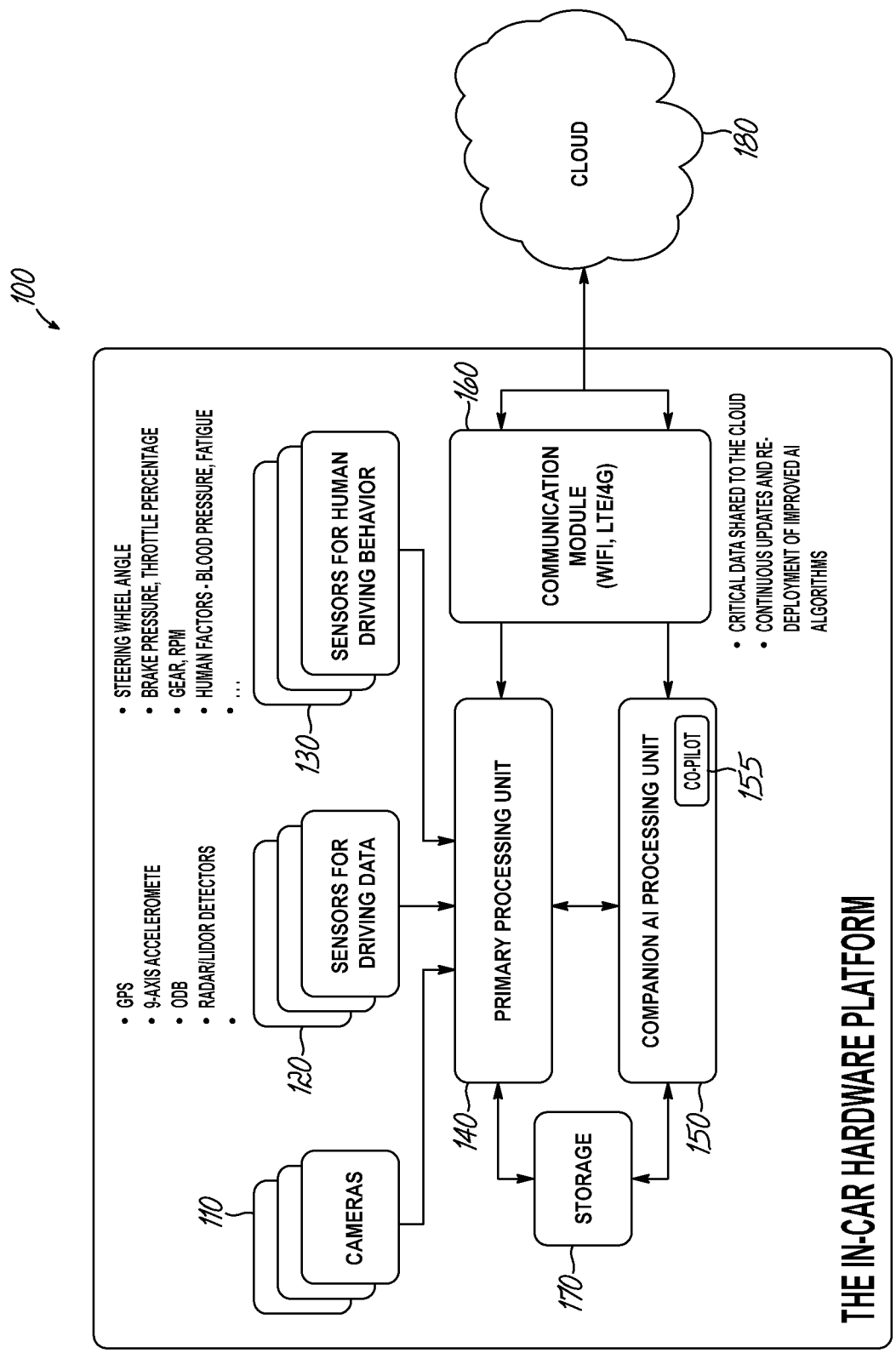
FIG. 1 illustrates an overview of the system platform architecture in embodiments of the present invention.

Referring now to example embodiments of the present invention in more detail. FIG. 1 depicts a high-level overview of the architecture of the system platform 100 in embodiments of the present invention. FIG. 1 illustrates example key components in the system architecture 100, the role of these components, and the interaction between these components. The system architecture includes a hardware platform that can be installed inside vehicles (e.g., cars, trucks, and such), a software operatively coupled to components of the hardware platform, and a cloud service. The hardware platform includes three sets of data acquisition components (modules): a set of one or more high-definition cameras 110, a set of one or more sensors 120 for capturing driving data, and a set of one or more sensors 130 for capturing the driving behavior of a human driver.

Embodiments of the set of one or more cameras 110, include, but are not limited to, a single camera lens facing outside the vehicle with different degrees of view angles, two camera lenses facing outside the vehicle capturing depth and distance measurements for reconstructing a 3D view, 360-degree panoramic view, with or without 3D reconstruction capability, built with a single lens or multiple lenses and image sensors, and such. The set of one or more cameras 110 may capture video, or other recordable medium, such as pictures, audio, and such.

Embodiments of the set of one or more sensors 120 for capturing driving data include, but are not limited to: a high-resolution GPS module, a high-precision 9-axis accelerometer that may capture not only acceleration, but also pitch/roll/yaw of the vehicle indicating its absolute orientation. The set of one or more sensors 120 may also include an on-onboard diagnostics (OBD) Bluetooth adapter, which may be installed on the vehicle to read information from the vehicle's controller area network (CAN) bus. The OBD Bluetooth adaptor may transmit the information read from the CAN bus to the hardware platform (e.g., primary processing unit 140 and/or companion AI processing unit 150) via Bluetooth. Sensors of the set of one or more sensors 120 for capturing driving data may include (or be operatively coupled to) other sensors often installed in self-driving cars, including, but not limited to: radar detectors, lidar detectors, tire pressure sensors, and the like. The set of one or more sensors 120 can collect and transmit data to the hardware platform (e.g., primary processing unit 140 and/or companion AI processing unit 150) either through direct wiring or wirelessly through Bluetooth. The data collected by the set of one or more sensors 120, together with information captured from the set of one or more cameras 110, provide rich information to be used in map construction and in formulating self-driving logic (algorithms) to be used to make driving decisions.

Embodiments of the set of one or more sensors 130 for capturing the driving behavior of a human driver include a third group of sensors, referred to as human driving behavior sensors. This set of one or more sensors 130 is used to accurately capture and recreate the actions the human driver makes in controlling the vehicle at any moment. These actions by the human driver include, but are not limited to: angling of the steering wheel, how hard the driver steps on the break (break pressure, break percentage), how hard the driver steps on the acceleration paddle (throttle percentage), gear chosen, indication signals, and whether the windshield wiper blade is on or off. Some of the human driving behavior data could also be read from the vehicle CAN bus through the OBD Bluetooth adapter. The set of one or more sensors 130 can be used to accurately capture data on "human driving decision" when real (human) people drive the vehicle. Further, in the case that certain human driving behavior data cannot be captured via direct detection by the set of one or more sensors 130 for capturing human driving behavior, this data can be calculated or approximated from measurements by the set of one or more sensors 120 for capturing driving data. For example, using the accelerometer and speed information from driving data sensors 120, logic/algorithms configured on the hardware platform can estimate the human driver's action on the break or the acceleration paddle. The captured data on human driving behaviors is extremely valuable, as this data can be used directly as a training set for a training system to learn and improve its decision-making models.

The primary processing unit 140, may be implemented as, but not limited to, an Ambarella A9/A12 chipset module. This chipset module generally includes a digital signal processing (DSP) unit, which has the primary role of optimizing configuration of image sensors and parameters for ensuing video encoding for compression, such as using H.264 or H.265 standards. This chipset module generally also includes a system on chip (SOC) with a Linux operating system (OS) or other similar operating system for general computation, setting up proper sensor drivers and/or drivers for hardware components, and handling network inputs/outputs (IOs) and local file system IOs. Some of the sensors of the sets of sensors 120, 130, such as the OBD adapter, steering wheel angle sensor, tire pressure sensor, and the like, communicate with the processing unit 140 wirelessly via, but not limited to, Bluetooth, Zigbee, and the like. Other sensors of the sets of sensors 120, 130 are directly built into the main hardware form factor of the system platform 100. The primary processing unit 140 may contain a generic CPU, such as an ARM Cortex CPU, which, although powerful for general-purpose computation, often is not optimized to efficiently handle computation of sophisticated AI logic/algorithms or sensor fusion algorithms (e.g., computation logic/algorithms based on deep learning).

The companion (specific-purpose) AI processing unit 150 is a powerful optimized processor that complements the primary processing unit 140 when the primary processing unit 140 cannot meet the requirement for processing speed or efficiency. The companion AI processing unit 150 may be implemented by, but not limited to, special types of Ambarella chipset modules, or a Movidius chipset module. These modules are designed and optimized, from an architectural perspective, to implement specific AI logic/algorithms, such as machine (deep) learning logic/algorithms, computer vision logic/algorithms, including, but not limited to, object recognition from video images, sensor fusion, making driving decisions based off video and sensory data, much more efficiently than generic CPUs. The application of a secondary AI processing unit 150 greatly enhances the system platform's capability to process large quantities of video and sensory data and implement sophisticated AI logic/algorithms to process this data. The application of a secondary AI processing unit 150 not only enables the system platform 100 to parse critical information regarding the driving of the vehicle for map construction, but also to finish computation in real-time to reach a driving decision at any moment.

In some embodiment, the companion AI processing unit 150 is not necessary to the system platform 100, as the primary processing unit 140 has enough computational capability alone to meet the real-time requirement of the system platform 100. Embodiments of the present invention are not bound by the existence or usage of a secondary processing unit (AI processing unit 150). The system platform 100 also includes storage 170 for use by the primary processing unit 140 and companion AI processing unit 150.

The primary processing unit 140 and AI processing unit 150 are configured with software modules having various logic/algorithms that are executed by the units 140, 150. For example, the AI processing unit 150 may be loaded with a "co-pilot" module 155 that includes specific AI logic/algorithms. The co-pilot module 155 is explained in further detail in FIG. 2. In some embodiments, the "co-pilot" module 155 includes logic/algorithms for processing the high-definition images captured by the set of one or more cameras 110 and the data captured by the sets of one or more sensors 120, 130.

The software modules configured on the AI processing unit 150 and/or primary processing unit 140 parse images from the video captured by the set of one or more cameras 110. The software modules may include advanced computer vision logic, which processes and analyzes the parsed images to further retrieve static information (objects) such as road signs, lanes, surrounding building structures, as well as real-time information such as traffic, accidents, weather conditions, surrounding vehicles, and such from the parsed images. The software modules may also accurately time-stamp the parsed images and synchronize the parsed images and static/real-time information with high-resolution GPS data and other driving data. The static and real-time information parsed from the video images, and synchronized with the high-resolution GPS data and other driving data, may be used to construct and update real-time maps, and assist in automated decision-making for self-driving.

Further the software modules may include logic to determine critical data from the video captured by the set of one or more cameras 110, the driving data captured from the set of one or more sensors 120, and human driver's behavior data captured from the set of one or more sensors 130. As previously described, the amount of data required to be transported to a cloud service 180 or any powerful system of servers would be prohibitively enormous. To address this data issue, one of the processing units 140, 150 may be configured with a software module (logic/algorithm) to derive "human decisions" from the human driver's behavior data. The processing units 140, 150 may be further configured to derive "machine decisions" from the captured video images and driving data. The "machine decision" being a driving decision (action) that would be made by the computer ("machine") controlling the vehicle, as derived from the captured images and data and an AI model. In some embodiments, deep-learning logic (configured in the co-pilot module 155) may be used to process the captured video images and captured driving data as a scenario and compute a "machine decision" of the driving actions that should be taken facing the scenario.

The software modules may then compare the derived "human decisions" and "machine decisions" and only transport differential data (i.e., data showing differences between "human decisions" and "machine decisions") to the cloud service 180. The differential data being critical data for learning and training self-driving models. In this way, the captured video and sensor data can be instantly compared within the system platform 100 (on the client side) and only critical data/images transferred to the cloud service 180. In some embodiments, a large discrepancy between "human decision" and "machine decision" data would trigger the system platform 110 to be alerted, and, in response, transfer the corresponding video images/data to the cloud for further storage and analysis.

As above described, the system platform 100 is a powerful platform for collecting critical data for map creation and updating for self-driving vehicles, and learning and training self-driving models. This system platform 100 may be installed in a standard vehicle to enable the collection of such data without the requiring the use of a self-driving car. However, if the system platform 100 transmitted all the captured video and sensor data need to be constantly transferred to the cloud 180, the sheer amount of data would be difficult to move around the network and manage by servers and applications. Further, most of the data may not be useful or valuable for model training and learning. Thus, the determining and transporting of only critical differential data provides a powerful feature in learning and training self-driving models.

The system platform 100 is also equipped with communication modules 160 to directly interact with the Internet and the cloud service 180. The system platform 100 can be specifically equipped/installed with a 4G/LTE module so the system platform 100 has direct connectivity and/or with a Wi-Fi module 160 so that an external hotspot is needed for connectivity. Both the primary processing unit 140 and the AI processing unit 150 interact with the cloud service 180 via these communication modules 160.

Co-Pilot Module

Figure 2:
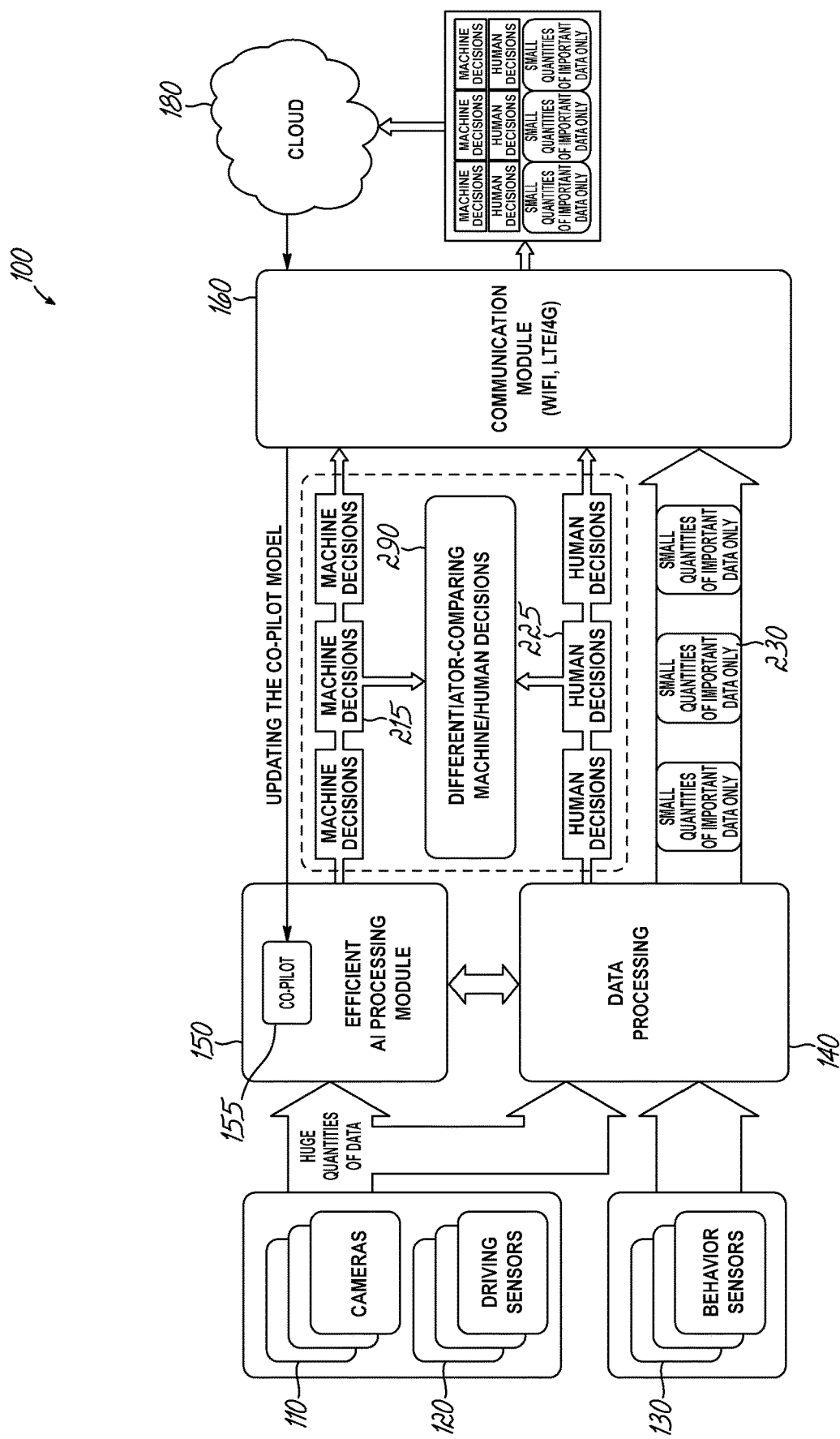
FIG. 2 illustrates the communication of the co-pilot module of FIG. 1 in embodiments of the present invention.

FIG. 2 demonstrates the function of the co-pilot module 155 in embodiments of the system platform 100. The co-pilot module 155 is a critical module, which effectively handles the challenges surrounding the quantity and quality of selected images/data to be transferred to the cloud 180 (or other powerful system of servers). The co-pilot module 155 identifies the most interesting and relevant data segments to be preserved and transferred 230 to the cloud service 180 (via communication modules 160) for future analysis, including learning and training AI models for making self-driving decisions. The co-pilot module 155 significantly reduces the amount of data to be preserved and transferred to the cloud service 180 by communicating with a differentiator module 290, which identifies critical data that indicates a differentiation between the captured driving data from the set of sensors 120 and captured human driver behavior data from the set of sensors 130. An AI model being learned and trained for determining the self-driving decision logic/algorithm by a training application can be continuously updated from the images/data transferred and stored at the cloud service 180. Note, the transferred and stored data may be raw images and data or may be preprocessed (formatted) by the system platform 100 for use as input to the AI self-driving models. In this way, the AI self-driving models are constantly improved based on new observations in the images and data captured by the system platform 100. Therefore, the system is a self-improving, evolving platform that selects data more accurately to create/updates an AI model that makes more intelligent human-like driving decisions. Note, the system platform 100 (AI processing unit/module 150 and primary data unit/module 160) may also transmit the machine decisions 215 and human decisions 225 without being first differentiated (in cases where this includes a manageable quantity of images/data)

In the example embodiment of FIG. 2, the co-pilot module 155 is a software module configured at the companion AI processing module/unit 150 to enhance processing speed and efficiency. In other embodiments, the co-pilot module 155 can be implemented on the primary processing module/unit 140 with the assistance of the companion AI processing unit 150 for processing. The AI processing unit 150 handles the speed/efficiency needed for executing the AI model calculation (configured at the co-pilot module 155) to determine driving decisions and actions based on current captured images from the sets of one or more cameras 110, and driver data captured from the one or more sensors 120.

The co-pilot module 155 receives the huge quantities of captured video from the set of one or more camera sensors 110 and captured data from the set of one or more sensors 120 for capturing driving data. The primary processing unit 140 is configured with software modules to synchronize, organize, and cleanse the captured video data and sensory data from the GPS, accelerometer, OBD, radar detector, lidar detector, and the like, so that the video images and sensor data can be readily fed into a self-driving AI model deployed within the co-pilot module 155. The AI model deployed within the co-pilot module 155 performs model calculation to derive driving actions that should be taken if there were a machine controlling the vehicle. Such "machine decisions" may include: acceleration, break, turn, indicate, and such. The configuration of the co-pilot module 155 at the AI processing unit 155 can make the calculation faster (in real-time) than if performed in on a generic CPU module (such as in primary processing module 140 in some embodiments).

At the same time, the set of one or more sensors 130 for capturing human driving behaviors captures data on the decisions made by real (human) drivers for controlling the vehicle, which includes data related to: acceleration, breaking, turning, signal indicating, and the like. In FIG. 2, this data is processed and recorded by the primary processing unit 140 for software modules configured at the primary processing unit 140 to determine the "human decisions" made during driving the vehicle. In this way, the system platform 100 has two streams of driving action (decision) data: one stream of actions ("human decisions") that have been captured in relation to human drivers, and the other actions ("machine decisions") calculated by the co-pilot module 155 based on captured video, captured data from driving sensors 120, and the current version of the deployed AI model.

The derived "machine decisions" and "human decision" are sent to the differentiator module 290 (which may be configured on the primary processing unit 140) for comparison and differentiation. The differentiator module 290 applies set of rules to determine whether the discrepancies between the "human decisions" and "machine decisions" meet certain criterion. If the differentiator module 290 determines (based on the rules) that the discrepancies do meet the certain criterion, the differentiator module 290 determines the discrepancies indicate a critical event valuable enough to be analyzed further for learning and training of AI modules. The differentiator module 290 then flags a predetermined length of the video/data segment indicating the differentiation.

Based on the output of the differentiator module 290, the system platform 100 (e.g., primary data unit 140) only stores and transmits (uploads) the flagged segments of video and sensor data to the cloud service 180 for further analysis and model learning and training when the network becomes available. In some embodiments, the flagged segments are preprocessed into a format or structure for direct input into learning and training models (training applications) or map applications. The transmitting/uploading may be performed either through Wi-Fi or 4G/LTE communication module 160. The mechanism of using the co-pilot module 155 and the differentiator 290 enables the identification of the most relevant and valuable segments of video and data and meaningfully reduces the amount of images and data to be transferred to the cloud service 180. Further, the AI model deployed and used by the co-pilot module 155 to make driving decisions can be easily upgraded to an improved version after the cloud service 180 receives additional data used to learn and train new AI models. Such upgrading guarantees that the AI models used by the co-pilot module 155 always are up-to-date so that the co-pilot module 155 and differentiator 290 function to provide the most needed (critical and relevant) information to the cloud service 180 (and in turn to learning and training the AI models).

Sample Implementations

Figure 3:
FIG. 3 illustrates an example implementation of the AI processing unit of FIG. 1 on a Movidius Chipset.
Figure 3:

FIG. 3 shows photos of a sample system implemented with an Ambarella chipset as the primary processing unit 140, embedded inside a commercially available Waylens Horizon product, and a Movidius MV0182 module as the AI processing unit 150.

Figure 4:
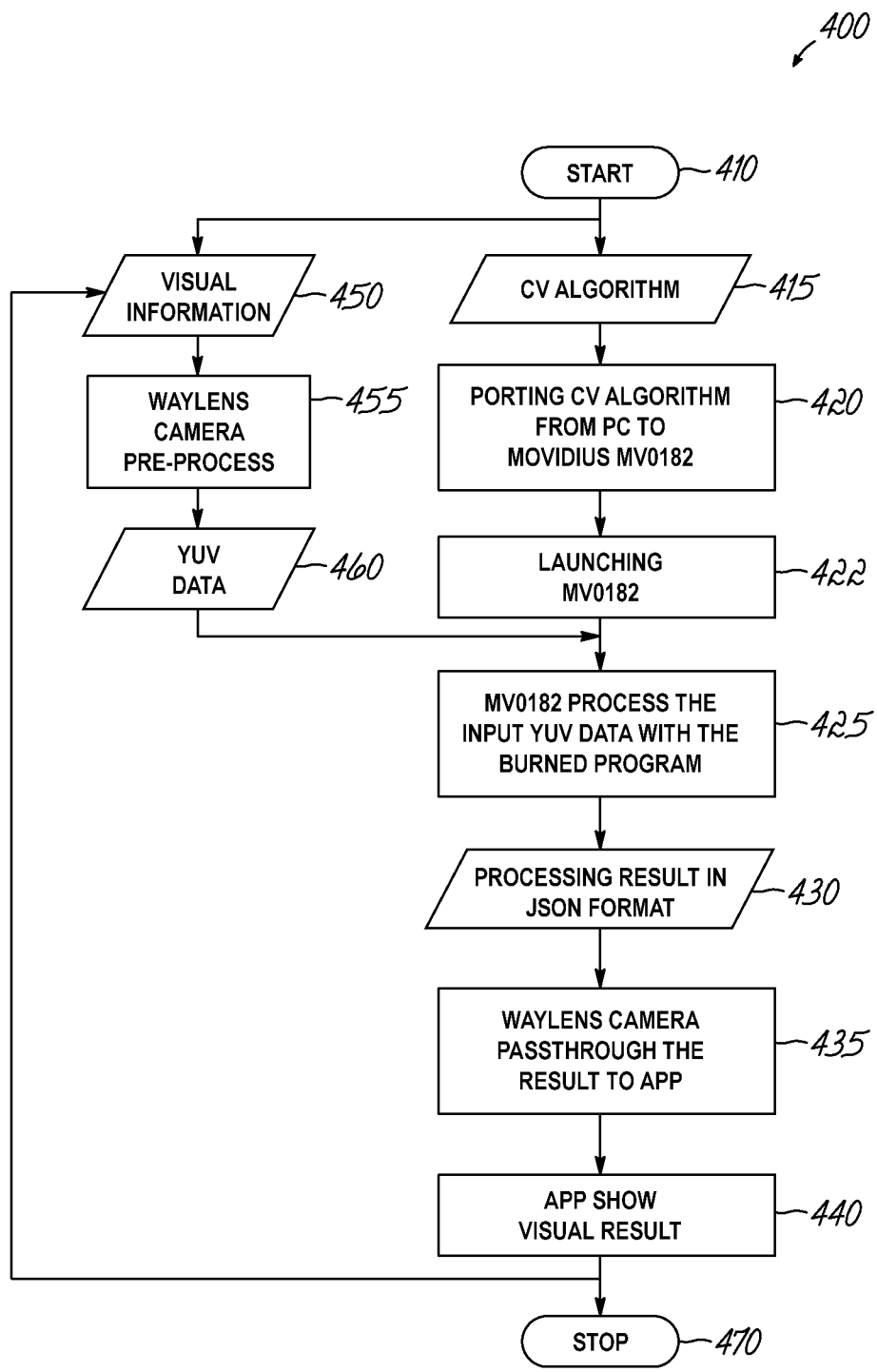
FIG. 4 is a flow chart of an example interaction between the primary processing unit and AI processing unit of embodiments of the present invention.

FIG. 4 is a flow chart illustrating a method 400 of receiving and processing video images (from the set of cameras 11) and sensory driving data (from the set of sensors 120) and driver behavior data (from the set of sensors 130) in embodiments of the present invention. In relation to FIG. 4, the primary processing unit 140 is implemented on an Ambarella module and receives and processes the video and data. The primary processing unit 140 communicated with the AI processing unit 150 implemented on a Movidius Mv0182 chipset for AI-optimized analysis. The AI processing unit 150 is configured with the co-pilot module 155 used to acquire critical information from the received image and sensory data.

The method 400 of FIG. 4 starts at step 410. The method, at step 415, retrieves an advanced computer vision (CV) algorithm from a personal computer (PC). The method, at step 420, then ports (preloads or burns) the CV algorithm from the PC to the co-pilot module 155 on the Movidius Mv0182 chipset. The Movidius MV0182 module is preloaded with the CV algorithm for parsing important objects from the video images for real-time map information, such as the presence of pedestrians. The method 400, at step 422, then launches the Movidius MV0182 module preloaded with the CV algorithm.

At step 450, primary processing unit 140 (Ambarella module) receives a video image from a camera of the set of one or more cameras 110. At step 455, the primary processing unit (of the Waylens Camera system, for example) 140 performs necessary storage and 10 on the video image, and, at step 460, transfers the video image to the AI processing unit 150 (Movidius module) in YUV format. Then, at step 425, the Movidius module processes the YUV data with the CV algorithm to efficiently run object recognition on the video, and at step 430 outputs recognized objects in JSON format. At step 435, the method 400 passes the image with the recognized objects to the application layer of the system platform 100 for visual display via an application interface executing on a user device (e.g., mobile phone, tablet, and the like). At step 440, the application interface shows the recognized object in the captured image (visual result) on the mobile device (and may also transfer the recognized object to the cloud service 180 and such). The method 400 ends at step 470.

Figure 5:
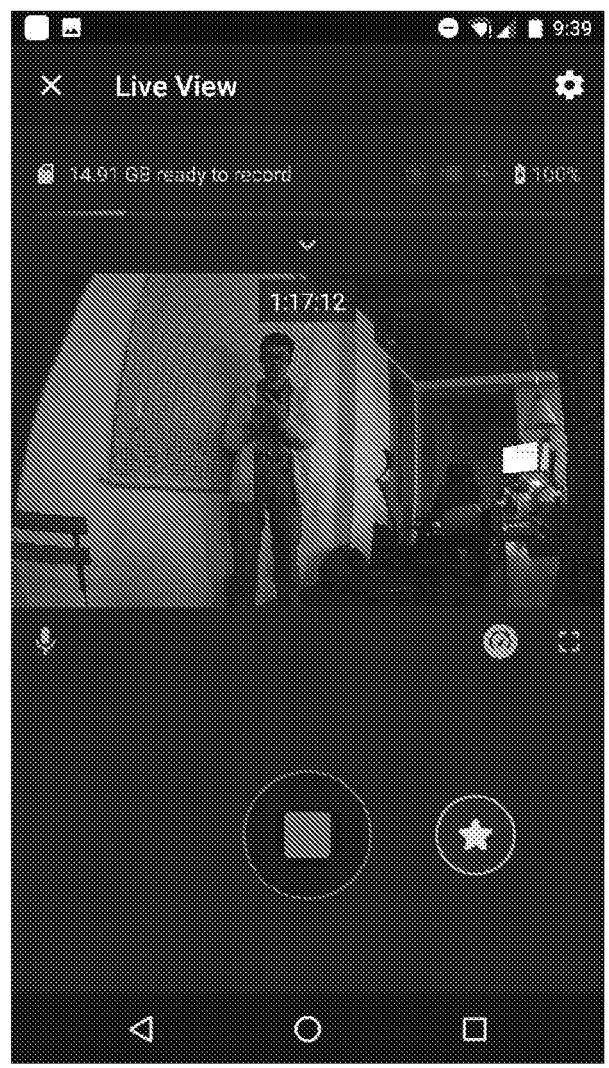
FIG. 5 illustrates an example application interface in embodiments of the present invention.

FIG. 5 illustrates an example application interface of the system platform 100 in embodiments of the present invention. In particular, FIG. 5 shows the example application interface recognizing a pedestrian in an image captured by the system platform 100 (as described in FIG. 4).

Computer Support

Figure 6:
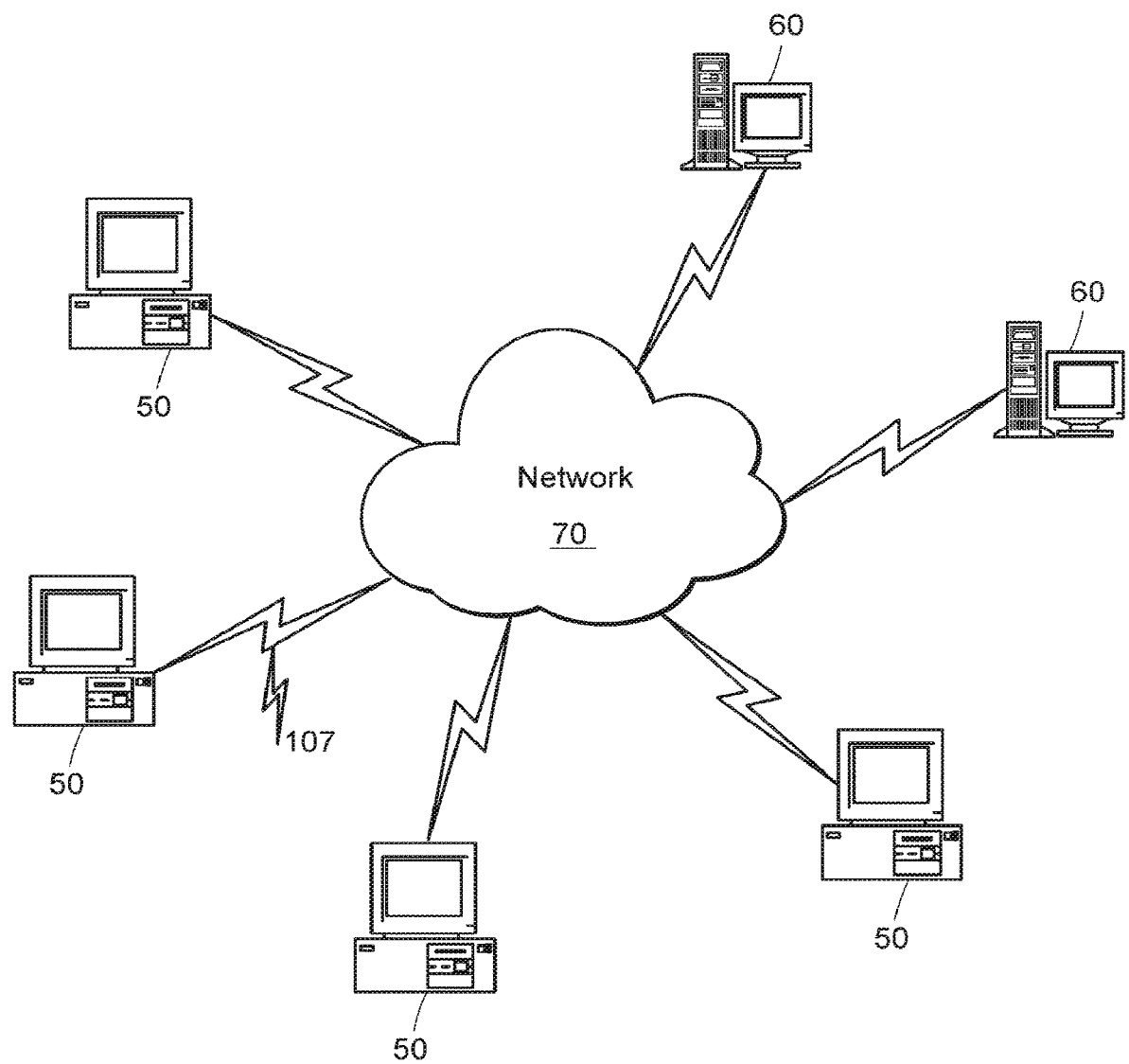
FIG. 6 is a schematic view of a computer network in which embodiments of the present invention are implemented.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. The client computer(s)/device 50 may include mobile devices, tablets, desktop computers, servers, and/or any other such computing devices with one or more processors and may configured with the visual application interface of steps 435 and 440 of FIG. 4. The server computer(s) 60 may be configured to include the hardware platform 100 of FIG. 1. The server computer(s) 60 may also be configured to execute the cloud service 180 of FIGS. 1 and 2 or any other service to store images and data for learning and training self-driving models. The Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. The communication module 160 of FIGS. 1 and 2 may transmit images/data from the hardware platform 100 of FIGS. 1 and 2 to the cloud service 180 and application interface (in steps 435 and 440 of FIG. 4) via the Communications network 70. Other electronic device/computer network architectures are suitable.

Figure 7:
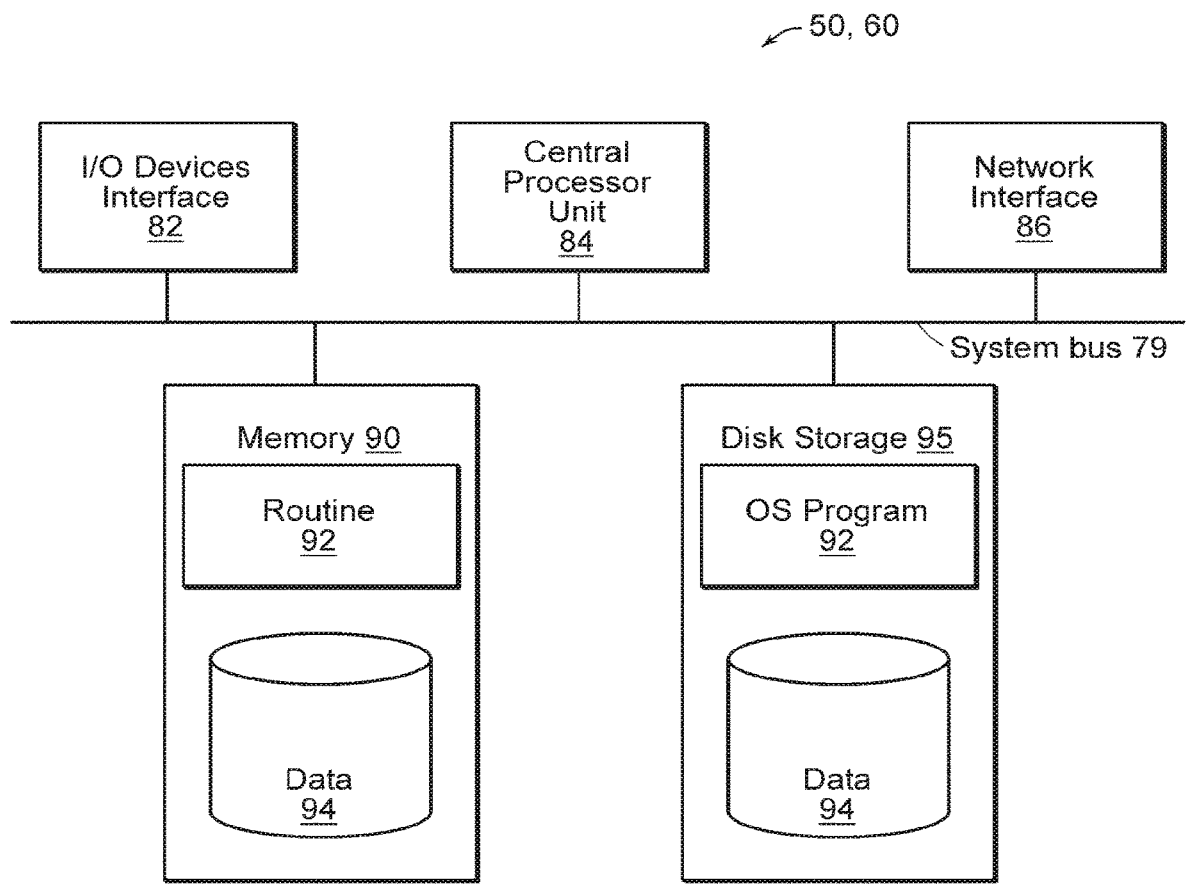
FIG. 7 is a block diagram of a computer node or device in the network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., code detailed above). Disk storage 95 provides non-volatile storage for computer software instructions 92 and data 94 used to implement an embodiment of the present invention. Central processor unit (CPU) 84 is also attached to system bus 79 and provides for the execution of computer instructions. In particular, memory 90 and/or storage 95 are configured with program instructions implementing the co-pilot module 155 configured at the AI processing unit 150 of the hardware platform 100 to provide the deep-learning algorithms for deriving "machine decisions" from captured camera images and raw sensor data, as detailed in FIG. 1. The memory 90 and/or storage 95 are configured with program instructions implementing the differentiator configured at the primary processing unit 140 of the hardware platform 100 for differentiating the "machine decisions" from "human decisions" derived from sensor data.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

While this invention has been particularly shown and described with references to example embodiments and implementations thereof, it will be understood by those skilled in the art that various changes in form and details (including changes in the described chipsets) may be made therein without departing from the scope of the invention encompassed by the appended claims.

What is claimed is:

1. A computer-implemented method of learning and testing a self-driving vehicle, the method comprising:
    capturing video data via one or more cameras, the captured video data including images representing conditions surrounding a vehicle;
    capturing driving data via one or more sensors, the driving data related to control of the vehicle;
    capturing driver behavior data via one or more sensors, the driver behavior data representing actions by a human controlling the vehicle;
    analyzing: (i) the captured video data and captured driving data to derive decisions a computer would make to control the vehicle, and (ii) the captured driver behavior data to determine decisions made by the human to control the vehicle;
    evaluating the derived computer decisions in comparison to the determined human decisions, the evaluating detecting data that indicates discrepancies between the derived computer decisions and the determined human decisions for controlling the vehicle; and
    providing the detected data as input for a training model, the provided input being used by the training model to produce decision logic for self-driving.

2. The computer-implemented method of claim 1, further comprising:
    analyzing the images of the captured video data, the analyzing parsing from the images information on the conditions surrounding the vehicle;
    determining a timestamp for the parsed information;

synchronizing the time stamped parsed information with the captured driving data, the captured driver behavior data, and global positioning system (GPS) data; and providing the synchronized data as input for map applications, the provided input being used by the map applications to construct real-time maps for self-driving.

3. The computer-implemented method of claim 2, wherein the conditions surrounding the vehicle include static conditions that include at least one of: road signs, lanes, and surrounding building structures.

4. The computer-implemented method of claim 2, wherein the conditions surrounding the vehicle include real-time conditions that include at least one of: traffic, accidents, weather, and surrounding vehicles.

5. The computer-implemented method of claim 2, wherein the providing of the map input includes transmitting the provided map input to a cloud service, wherein map applications access the provided map input from the cloud service.

6. The computer-implemented method of claim 2, wherein the providing of the map input includes transmitting the provided model input to cloud service, wherein training applications access the provided model input from the cloud service.

7. The computer-implemented method of claim 1, wherein the derive decisions are calculated using an artificial intelligence (AI) model of a self-driving vehicle.

8. A computer system for learning and testing a self-driving vehicle, the system comprising:

one or more cameras configured to capture video data including images representing conditions surrounding a vehicle;

one or more sensors configured to capture driving data related to control of the vehicle; one or more sensors configured to capture driver behavior data representing actions by a human controlling the vehicle; and one or more processing units configured to:

analyze: (i) the captured video data and captured driving data to derive decisions a computer would make to control the vehicle, and (ii) the captured driver behavior data to determine decisions made by the human to control the vehicle;

evaluate the derived computer decisions in comparison to the determined human decisions, the evaluating detecting data that indicates discrepancies between the derived computer decisions and the determined human decisions for controlling the vehicle; and provide the detected data as input for a training model, the provided input being used by the training model to produce decision logic for a self-driving.

9. The computer system of method of claim 8, the one or more processing units further configured to:

analyze the images of the captured video data, the analyzing parsing from the images information on the conditions surrounding the vehicle;

determine a timestamp for the parsed information;

synchronize the time stamped parsed information with the captured driving data, the captured driver behavior data, and global positioning system (GPS) data; and provide the synchronized data as input for map applications, the provided input being used by the map applications to construct real-time maps for self-driving.

10. The computer system of method of claim 9, wherein the conditions surrounding the vehicle include static conditions that include at least one of: road signs, lanes, and surrounding building structures.

11. The computer system of method of claim 9, wherein the conditions surrounding the vehicle include real-time conditions that include at least one of: traffic, accidents, weather, and surrounding vehicles.

12. The computer system of claim 9, wherein the providing of the map input includes transmitting the provided map input to a cloud service, wherein map applications access the provided map input from the cloud service.

13. The computer system of claim 9, wherein the providing of the map input includes transmitting the provided model input to cloud service, wherein training applications access the provided model input from the cloud service.

14. The computer system of claim 8, wherein the derive decisions are calculated using an artificial intelligence (AI) model of a self-driving vehicle.

15. The computer system of claim 14, wherein a processing unit of the one or more processing units is an optimized processor suited for AI applications and the AI model is configured on the processing unit.

16. The computer system of claim 14, wherein the processing unit is a Movidius chipset module.

* * * * *